United States Patent
Wurl et al.

[11] Patent Number: 5,953,916
[45] Date of Patent: Sep. 21, 1999

[54] MASTER CYLINDER

[75] Inventors: Gerhard Wurl, Rodgau; Udo Jungmann, Mörfelden; Harald König, Ober-Mörlen; Heinrich Kreh, Florstadt, all of Germany

[73] Assignee: ITT Manufacturing Enterprises Inc., Wilmington, Del.

[21] Appl. No.: 09/043,091

[22] PCT Filed: Sep. 11, 1996

[86] PCT No.: PCT/EP96/03979

§ 371 Date: May 26, 1998

§ 102(e) Date: May 26, 1998

[87] PCT Pub. No.: WO97/12792

PCT Pub. Date: Apr. 10, 1997

[30] Foreign Application Priority Data

Sep. 29, 1995 [DE] Germany .................. 195 36 334

[51] Int. Cl.[6] .................................................. F15B 7/08
[52] U.S. Cl. .................................................... 60/588
[58] Field of Search ................................... 60/588

[56] References Cited

U.S. PATENT DOCUMENTS

| 2,127,290 | 8/1938 | Farina ............................. 60/588 |
| 2,195,244 | 3/1940 | Ericson ............................ 60/588 |
| 5,121,686 | 6/1992 | Schonlau et al. .................. 60/588 |
| 5,187,934 | 2/1993 | Mori . |
| 5,251,446 | 10/1993 | Mori et al. . |

FOREIGN PATENT DOCUMENTS

| 2327896 | 3/1977 | France . |
| 2370187 | 2/1978 | France . |
| 4240515 | 6/1994 | Germany . |
| 2266752 | 11/1993 | United Kingdom . |

*Primary Examiner*—F. Daniel Lopez
*Attorney, Agent, or Firm*—Rader, Fishman & Grauer PLLC

[57] ABSTRACT

To ensure pressure compensation and the replenishment function of a master cylinder, the present invention discloses the provision of supply channels configured as slits (40). The slits (40) are adequate to ensure pressure compensation and the replenishment action when the brake system is bled. Due to their large cross-section, the slits permit a large fluid flow which is required, for example, to supply the pump in brake systems which independently initiate a braking operation.

6 Claims, 2 Drawing Sheets

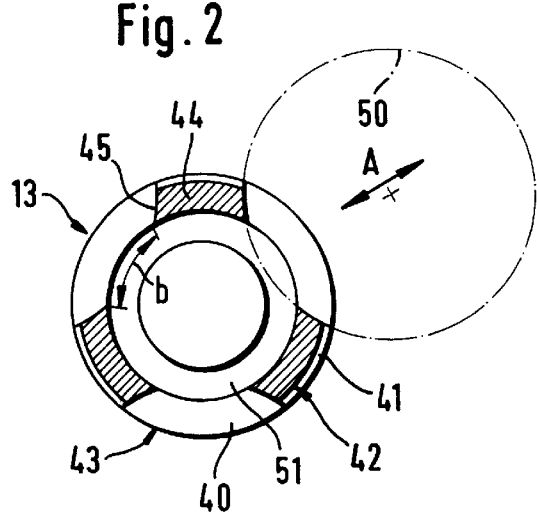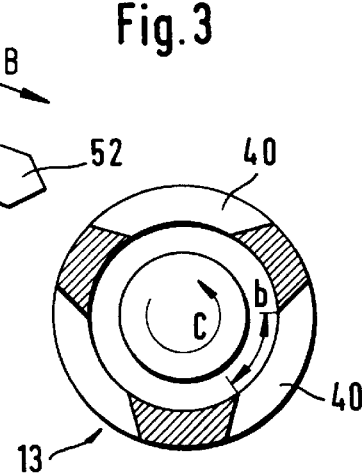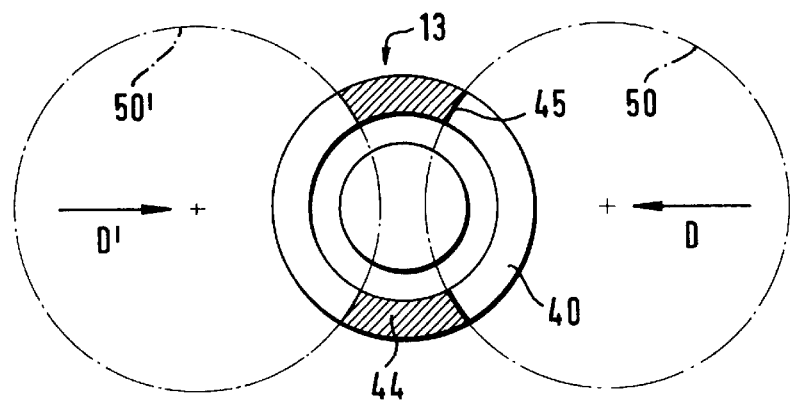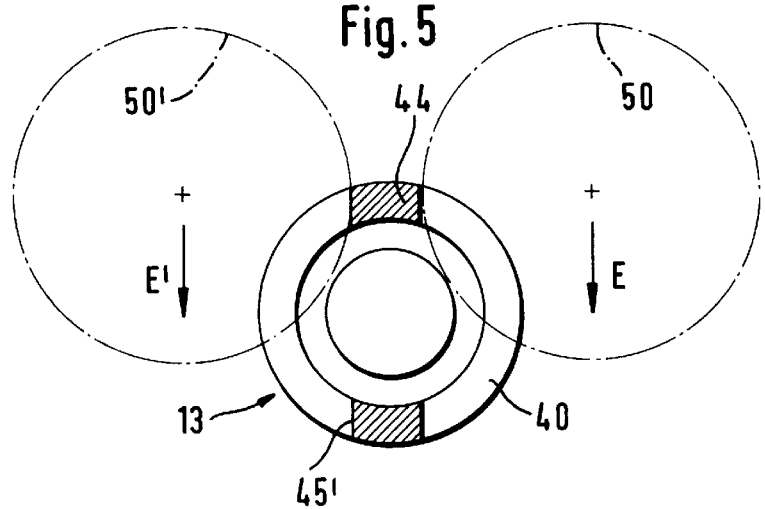

MASTER CYLINDER

BACKGROUND OF THE INVENTION

The present invention relates to a master cylinder, in particular for a hydraulic automotive vehicle brake system.

A master cylinder of this type is disclosed in U.S. Pat. No. 5,187,934. To ensure pressure compensation between the pressure chamber and the supply chamber and the function of replenishment from the supply chamber into the pressure chamber, pressure compensation ports configured as bores are provided in the pistons of the prior art master cylinder which are designed as plungers. The bores are adequate for pressure compensation and for the protection of the replenishment action during bleeding of the brake system. However, when the master cylinder is intended for use in brake systems with traction slip control, driving dynamics control or other independently operable brake systems, a small number of bores are not sufficient to furnish the fluid flow which is required by the pump of the brake system. The small cross-section of the bores produces an excessive throttling resistance, with the result that the fluid volume required in the independently controlled braking mode (for example, traction slip control or driving dynamics control) cannot be made available in a sufficiently short time. The provision of a larger number of bores increases the manufacturing costs and, thus, is uneconomical.

An object of the present invention is to overcome the problem mentioned with respect to the state of the art without unreasonably increasing the manufacturing costs.

SUMMARY OF THE INVENTION

Therefore, according to the present invention, several slits extending in the circumferential direction are provided instead of the compensating bores in the piston. Compared to the bores, the advantage of the slits is that they have a larger cross-section and, also, smaller axial dimensions. This avoids excessive wear of the sealing element, especially, of the inside sealing lip of a sealing sleeve. Further, the slits permit a sufficient fluid flow to the pump of the controlled brake system. Besides, the small width of the slits satisfies the requirement of achieving smallest possible lost travels in a special way.

In a preferred aspect of the present invention, the slits are positioned in the groove bottom of a circumferential groove. It is thereby ensured, even without an accurate deburring action, that sharp edges which might damage the sealing elements are not produced at the slits when the slits are recessed. More particularly, the circumferential groove is given flat flanks which also prevents the sealing elements from being damaged when overridden.

The slits can be made in various manufacturing processes, such as milling, for example, by a disc-milling cutter, sawing, or by eccentric internal side turning or turning outside diameter processes. Basically, the slits may also be punched when the pistons are made of heatproof material, such as steel, where a thinner wall thickness is possible. A round boundary line between the web and the slit occurs when single of multiple radial milling is effected, or also with slits made by eccentric turning. Correspondingly straight boundary lines can be produced by single, double or multiple continuous milling.

Favorably, the piston of the present invention can be made of metal or plastic.

Further advantages of the present invention can be seen in the following description by way of the Figures.

BRIEF DESCRIPTION OF THE DRAWINGS

In the drawings,

FIG. 2 is a cross-sectional view of a piston of a master cylinder of the present invention on the level of the supply slits.

FIGS. 3 to 5 show further pistons corresponding to the FIG. 2 embodiment.

DETAILED DESCRIPTION OF THE DRAWINGS

Figure 1:
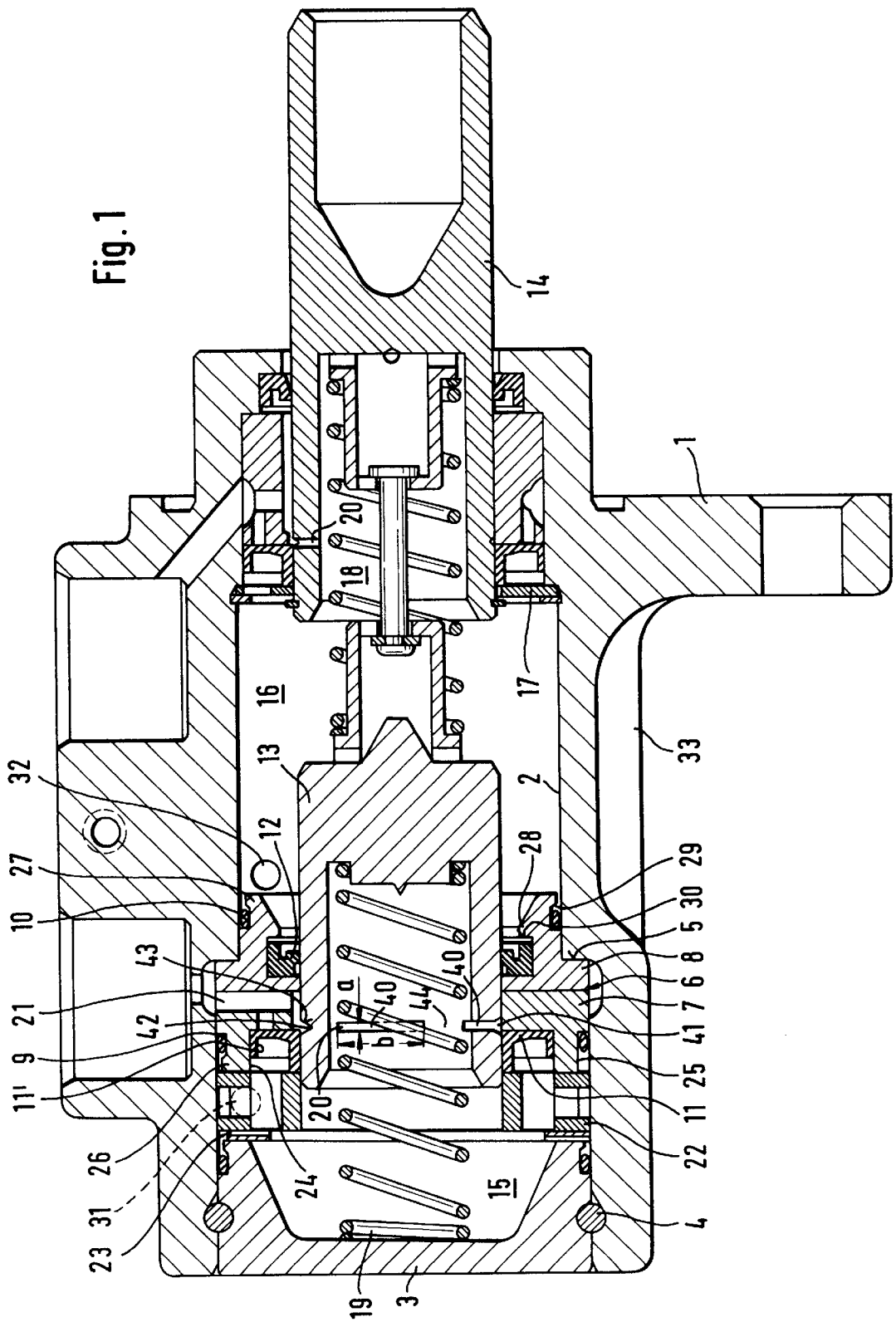
FIG. 1 is a longitudinal cross-sectional view of a master cylinder of the present invention.

FIG. 1 shows a master cylinder with a housing 1 in which a stepped bore 2 is incorporated that is closed by a cover 3. Cover 3 is undetachably connected to the housing 1 by a wire 4.

Bearing against a step 5 of bore 2 is a guide element 6 which comprises two partial elements 7, 8 in the present embodiment. Each of the partial elements 7, 8 is sealed in relation to the bore 2 by a bore sealing element 9, 10 and in relation to a piston 13 by a sealing element 11, 12. The piston 13 bounds a pressure chamber 15 which extends in the bore 2 until cover 3, on the one hand, and a primary pressure chamber 16, on the other hand, which extends in the bore 2 in opposite direction and is limited by a primary piston 14. Primary piston 14 is also sealed in the housing 1 and has a stop 17 formed on the housing.

A per se known spring assembly 18 is arranged between the primary piston 14 and the piston 13 and resets the pistons 13, 14, in the non-actuated position of the master cylinder, into their initial position in interaction with a spring 19 compressed between the piston 13 and the cover 3.

Supply channels 20 configured as slits 40 are provided in the piston 13. The slits 40 extend in a plane vertically to the axis of the piston 13 or the bore 2. The axial extension a of the slots is substantially smaller than their width b in a circumferential direction. The slits 40 open into a circumferential groove 41 on the outside of the piston 13. Inclined flanks 43 follow on either side of the groove bottom 42 into which the slits 40 open. The flanks 43 have been represented in an excessively steep manner in the drawing (upper part of the piston 13). In reality, the flanks have a flat angle relative to the outside surface of the piston 13. This prevents a possible damage of the sealing element 11 during forward and backward movement of the piston 13. Between the slits 40, webs 44 connect the front part of the piston 13 to its rear part.

The supply channels 20 connect the pressure chamber 15 to a supply chamber 21 provided in the guide element 6 in the reset condition of the piston 13. The supply chamber 21 is connected to an unpressurized supply reservoir not shown. An annular element 22 and a spring element 23 are arranged between the guide element 6 and the cover 3. Instead of the supply slits 40, bores are configured as supply channels 20 in the primary piston 14. Naturally, the provision of supply slits is also possible. The pressure chambers 15, 16 are connected to wheel brake cylinders of an automotive vehicle (not shown) by way of pressure ports 31, 32. An axial web 33 is used to stabilize the housing 1.

The primary piston 14 is displaced from its illustrated inactive position (to the left in the drawing) for operation of the master cylinder. This movement is transmitted by the spring assembly 18 to the piston 13 which also moves to the left. In this movement, the circumferential groove 41 is covered by the sealing element 11, with the result that the pressure fluid connection between the pressure chamber 15 and the supply chamber 21 is interrupted. Further displacement of the piston 13 to the left causes pressure increase in the pressure chamber 15, and pressure fluid is supplied to the wheel brakes by way of the pressure port 31.

Primary piston 14 is moved to the right for pressure reduction, thereby causing a corresponding return movement of the piston 13. As soon as the piston 13 has adopted its illustrated reset position, there is a connection between the pressure chamber 15 and the supply chamber 21 again. Any possibly existing pressure in excess of atmospheric pressure in the pressure chamber 15 is reduced because pressure fluid is discharged through the slits 40 and the supply chamber 21 into the unpressurized reservoir.

Should a defined vacuum prevail in the pressure chamber 15 when the actuating action is terminated, which vacuum impairs complete resetting of the piston 13 into its initial position, the outward sealing lip 11' of the sealing element may swing over to the left. This permits replenishment of pressure fluid from the supply chamber 21 into the pressure chamber 15 even if the slits 40 are still closed by the sealing element 11. The final pressure compensation will then take place by way of the opened slits in the piston.

When the master cylinder of the present invention is mounted into an electronically controlled brake system, for example, an ABS/TCS system, or any other system which independently performs braking operations, for example, a system for the control of driving stability, vehicle speed, the distance from a vehicle traveling ahead, or similar systems, it may be necessary (depending on the configuration of the system) that pressure fluid is replenished from the supply reservoir by way of the supply chamber 21 and the supply channels 20 into the pressure chamber 15 and from said by way of the pressure ports 31 to a consumer, for example, a pump. To be able to supply a maximum possible volume in a short time and without great resistance, the supply channels 20 are configured as slits 40. The slits have a large cross-section and a small axial extension a nevertheless. The small axial extension a necessitates that the lost travel of the piston 13, i.e. the distance which the piston 13 must cover to interrupt the connection between the pressure chamber 15 and the supply chamber 21, can be rated to be very short.

FIG. 2 shows a piston 13 in a section vertically to the axis of the bore 2 on the level of the slits 40. The slits 40 are made by a radial approach of a disc-type milling cutter 50 corresponding to arrow A. Therefore, the slits have a round boundary line 45 with respect to the webs 44. In the FIG. 2 embodiment, three webs 44 and three slits 40 are provided which have identical dimensions. However, a larger or a smaller number of slits and webs is also possible. In particular, it is possible to provide a first slit 40 which has short dimensions in a circumferential direction and a second slit 40 which has long dimensions in a circumferential direction.

In the drawing, the circumferential groove 41 can be seen, with the slits 40 opening into the groove bottom 42, and the flat flanks 43 adjacent to the slits 40. Further, a circumferential annular groove 51 can be seen on the inside bottom of piston 13 which is used to accommodate the spring 19 (not shown).

FIG. 3 shows a cross-section, corresponding to FIG. 2, taken through another piston 13 having slits 40 which are made by eccentric turning. To this end, a cutting tool 52 is moved to the piston 13 and away from it (corresponding to arrow B), the piston rotating corresponding to arrow C. The slits 40 are thereby produced. The width b of the slits 40 in a circumferential direction depends on the rotational speed of the piston 13 and the frequency of feed of the cutting tool 52. During a rotation of the piston 13, the cutting tool is set axially two or three times and thereby produces the slits 40 in the piston 13.

FIG. 3 shows the extension b of the slits 40 in a circumferential direction at their narrowest point.

FIG. 4 shows a piston 13 with two radially milled slits 40. Two disc-type milling cutters 50, 50' are moved radially to the piston, corresponding to the arrows D, D', and away again. The webs 44 with round boundary lines 45 are thereby produced.

FIG. 5 shows a piston 13 with two continuously milled slits 40. Two disc-type milling cutters 50, 50' are shifted in parallel corresponding to arrows E, E', with the result of webs 44 with straight boundary lines 45'. Corresponding slits 40 may also be produced by stationary rotating disc-type milling cutters 50 through which the piston 13 is passed.

Thus, according to the present invention, supply channels configured as slits 40 are provided to ensure pressure compensation and the replenishment function of a master cylinder. The slits 40 are adequate for pressure compensation and for protection of the replenishment action during bleeding of the brake system. Due to their large cross-section, the slits permit a great fluid flow which is necessary, for example, for the supply of the system pump in brake systems which independently trigger a braking operation. The slits 40 of the present invention have only a low throttling resistance so that the fluid volume required in automatic braking operations (traction slip control or driving stability control operations, or the like) can be delivered sufficiently rapidly. An advantage of the slits 40 is that they have a larger cross-section compared to conventional compensating bores and, thus, permit a sufficient volume flow to the pump. Further, the small width of the slits 40 achieves the objective of smallest possible lost travels. The slits 40 open into the groove bottom 42 of a circumferential groove 41 having flat, inclined flanks. Even without accurate deburring actions, sharp edges are prevented which can occur when the slits 40 are recessed. Burr edges are also prevented which may be caused when the milling tool is removed from the piston surface and will damage the inner sealing lip the sealing element 11. The slits 40 can be made in various manufacturing processes, such as milling, by a disc-type milling cutter, sawing, or by eccentric internal side turning or turn outside diameter processes. Basically, the slits 40 may also be punched in pistons 13 of high-resistant material, such as steel, where a thinner wall thickness is possible.

We claim:

1. A master cylinder having a housing wherein a pressure chamber is limited by a movable piston that is sealed by sealing elements, stationarily mounted in the housing, in relation to the pressure chamber and a supply chamber, wherein the piston has a reset position and an actuated position and includes at least one supply channel establishing, in the reset position of the piston, a connection between the pressure chamber and the supply chamber, and separating the chambers from each other in the piston's actuated position, wherein the piston has a periphery along which at least one slot extends thereby forming the supply channel and opens into a groove bottom of a circumferential groove in the periphery of the piston.

2. A master cylinder as claimed in claim 1, wherein the circumferential groove includes flat flanks.

3. A master cylinder as claimed in claim 1, wherein the at least one slot is at least two slots which are separated by webs, and the webs include round boundary lines.

4. A master cylinder as claimed in claim 1, wherein the at least one slot is at least two slots which are separated by webs, and the webs include straight boundary lines.

5. A master cylinder as claimed in claim 1, wherein the piston is made of metal.

6. A master cylinder as claimed in claim 1, wherein the piston is made of plastic.

* * * * *